United States Patent

Diebel et al.

[11] Patent Number: 5,971,511
[45] Date of Patent: Oct. 26, 1999

[54] CONTROL BOX WITH A FRAME STRUCTURE

[75] Inventors: Michael Diebel, Dillenburg; Frank Küster, Breitscheid-Medenbach, both of Germany

[73] Assignee: Rittal-Werk Rudolf Loh GmbH & Co. KG, Herborn, Germany

[21] Appl. No.: 09/051,647

[22] PCT Filed: Feb. 13, 1997

[86] PCT No.: PCT/EP97/00659

§ 371 Date: Apr. 21, 1998

§ 102(e) Date: Apr. 21, 1998

[87] PCT Pub. No.: WO97/34347

PCT Pub. Date: Sep. 18, 1997

[30] Foreign Application Priority Data

Mar. 13, 1996 [DE] Germany .................. 196 09 704

[51] Int. Cl.⁶ .................................................. A47B 47/00
[52] U.S. Cl. ................... 312/265.3; 312/400; 312/265.5
[58] Field of Search .............................. 312/265.1, 265.2, 312/265.3, 265.4, 257.1, 263, 326, 329, 400, 223.1, 265.5; 211/26, 189, 191

[56] References Cited

U.S. PATENT DOCUMENTS

| | | | |
|---|---|---|---|
| 3,856,374 | 12/1974 | Christen | 312/400 X |
| 5,171,079 | 12/1992 | Bayerle | 312/400 X |
| 5,388,903 | 2/1995 | Jones et al. | 312/265.3 X |
| 5,536,079 | 7/1996 | Kostic | 312/265.3 |

FOREIGN PATENT DOCUMENTS

| | | |
|---|---|---|
| 0018330 | 10/1980 | European Pat. Off. . |
| 1910585 | 2/1965 | Germany . |
| 3344598 | 9/1984 | Germany . |
| 3731547 | 6/1990 | Germany . |
| 9202819 | 10/1992 | Germany . |
| 29519260 | 3/1996 | Germany . |

*Primary Examiner*—Peter M. Cuomo
*Assistant Examiner*—James O. Hansen
*Attorney, Agent, or Firm*—Pauley Peterson Kinne & Fejer

[57] ABSTRACT

A switchgear cabinet having a rack assembled from a plurality of frame legs bent at the side walls. The rack has open, vertical sides which are closed off by side walls and a rear wall fastened to facing frame legs of the rack. A cabinet door is hingedly connected to vertical frame legs of the rack front against which it is arrested in the closed position. The rear and side walls are covered by corresponding protective walls spaced apart from the rear and side walls and connected to facing vertical frame legs of the rack. The cabinet door is double-walled, an outer door wall of which is spaced apart from an inner door wall thereof and forms receptacle spaces for seals, hinges and locking elements free in the direction of vertical edges of the outer door wall. The protective walls of the side walls have beveled protective wall vertical edges which cover the free space between the protective wall of the rear wall and the receptacle space between the outer door wall and the rack.

26 Claims, 4 Drawing Sheets

CONTROL BOX WITH A FRAME STRUCTURE

BACKGROUND OF THE INVENTION

1. Field of the Invention

This invention relates to a switchgear cabinet with a rack, which is assembled from individual frame legs or is formed by individual frame legs bent off at the side walls, wherein the open, vertical sides of the rack are closed off by side walls and a rear wall, which are fastened on the facing frame legs of the rack, and wherein a cabinet door is hinged on the two vertical frame legs of the front of the rack and can be stopped in the closed position.

2. Description of Prior Art

Switchgear cabinets of this type are taught by German Patent Publication DE 33 44 598 C1 and German Patent Publication DE 37 31 547 A1. These publications teach that the interior of the switchgear cabinet is covered on all sides by a wall element which is employed as a rear wall, side wall or cabinet door. In this case, the joints between neighboring wall elements are a particular weak spot whereby forced access to the interior of the switchgear cabinet is possible. For switchgear cabinets placed outdoors, the built-ins in the switchgear cabinet are not sufficiently protected against vandalism.

A weather-proofed switchgear cabinet with a removable protective hood, which is maintained spaced apart from the connecting surfaces of the switchgear cabinet, is disclosed by German Patent Publication DE 295 19 260 U1.

A switchgear cabinet with double walls, which are insulated against each other by mineral wool, is taught by German Patent Publication DE 92 02 819 U1.

SUMMARY OF THE INVENTION

It is an object of this invention to provide a switchgear cabinet of the type discussed hereinabove whereby forcible access to the built-ins in the interior is made considerably more difficult.

This and other objects are attained by a switchgear cabinet in accordance with this invention in which the rear wall and the two side walls are covered by protective walls spaced apart therefrom and are connected to the facing vertical frame legs of the rack. The cabinet door is made of double walls wherein the inner door wall is at a distance from the outer door wall and forms receptacle spaces for seals, hinges and locking elements free in the direction of the vertical edges of the outer door wall. The protective walls of the side walls are beveled, at least in the area of their vertical edges, such that they cover the free spaces between the protective wall of the rear wall and the rack and the receptacle spaces between the outer door wall and the rack and, therefore, their fastening points.

In this way, a double wall, formed by the wall element and the protective wall is always obtained in the area of the vertical sides of the rack, without complicating the components and increasing the assembly effort for the switchgear cabinet. The fastening points at all joints are covered and not accessible. In addition, the joints essentially present the use of tools for forcibly removing the protective wall from the rack. In this way, the switchgear cabinet is sufficiently secured against vandalism.

An increased protection against rain and water spray is also achieved by this design, since the sealing elements are moistened. Furthermore, an increased HF protection is achieved as a result of this geometry.

In order to also provide protection for the underside and the top of the switchgear cabinet, in accordance with one embodiment of this invention, the underside of the rack is connected to a base. In accordance with one embodiment of this invention, an additional housing, for example for an air conditioner, is fastened on the top of the rack, which can also be double-walled.

The attachment of the protective wall in the area of the rear wall is achieved in accordance with one embodiment of this invention in such a way that the protective wall for the rear wall has, in the area of its beveled vertical sides, connecting bolts attached on its inside, which are screwed together with a profile side of the facing vertical frame legs of the rack. For fastening the rear wall, the rear wall has edges beveled in an L-shape, whose end sections rest by means of seals against the sealing strips of the facing frame legs, and the L-shaped edges have bores for the connecting bolts of the associated protective wall and are held together with it on the rack.

In order to keep the free space between the protective wall of the rear wall and the rack as small as possible, in accordance with one embodiment, the protective wall of the rear wall has a circumferential edge bent inward at right angles, which at least partially covers the L-shaped edge of the rear wall and the sealing strips of the frame legs.

In accordance with one embodiment of this invention, the connecting bolts are supported by their ends, which are provided for the reception of threads, on profile sides of the facing vertical frame legs of the rack, which are aligned parallel to the rear wall. The fastening screws provided for fastening are inserted through bores in these profile sides and are screwed into the threaded receptacles of the connecting bolts. The rear wall can, thus, be fastened on the rack together with its associated protective wall.

In accordance with one embodiment, the frame leg is embodied as an open or closed hollow profiled section. The profile sides of the frame legs which are aligned parallel to these profile sides and are spaced apart from them are provided with aligned openings for introducing the fastening screws through these openings into the bores of the profile sides facing the rear wall.

For the application of the protective walls for the side walls, the bevels provided at the vertical edges of the protective walls for the side walls are connected to profile sides of the facing frame legs. In this case, the profile sides of the frame legs are oriented vertically with respect to the protective walls.

Covering of the fastening places in this case is achieved in a simple manner. The end sections of the protective walls for the side walls are inserted into the free spaces between the protective wall for the rear wall and the rack, and into the receptacle spaces between the outer door wall and the rack.

In accordance with one embodiment of this invention, the double-wall embodiment of the cabinet door is achieved where the inner door wall is supported by a beveled edge on the inside of the outer door wall and is connected to the latter, for example welded to it. Alternatively, the inner door wall is twice beveled and through the end section connected to the inside of the outer door wall, and the end sections extend as far as the edges of the outer door wall. In both cases, one receptacle space is created up to the edge of the outer door wall in the area of the vertical sides, in which elements for hinging, locking and sealing of the cabinet door in the closed position, such as seals, hinges, lock elements and the like, can be housed.

A considerable simplification in the structure of the switchgear cabinet results in accordance with one embodiment where the rear wall and the protective wall associated with it form a unit which is constructed identical to the double-walled cabinet door comprising the inner and outer door wall.

In accordance with a further embodiment of this invention, the protective walls and the outer door wall are provided with an additional protective surface layer, while the rack, the rear wall, the side wall and the inner door wall comprise electrically conducting surfaces, i.e. without an additional protective surface layer. Consequently, it is possible to match the surface design of the "inner cabinet", constituted by the side walls, the rear wall and the inner door wall, and of the "outer cabinet", constituted by the protective walls and the outer door wall, optimally to the conditions of their employment, for example protection from environmental effects and visual appearance.

BRIEF DESCRIPTION OF THE DRAWINGS

This invention will be explained in more detail by means of exemplary embodiments represented in the drawings wherein.

DESCRIPTION OF PREFERRED EMBODIMENTS

Figure 1:
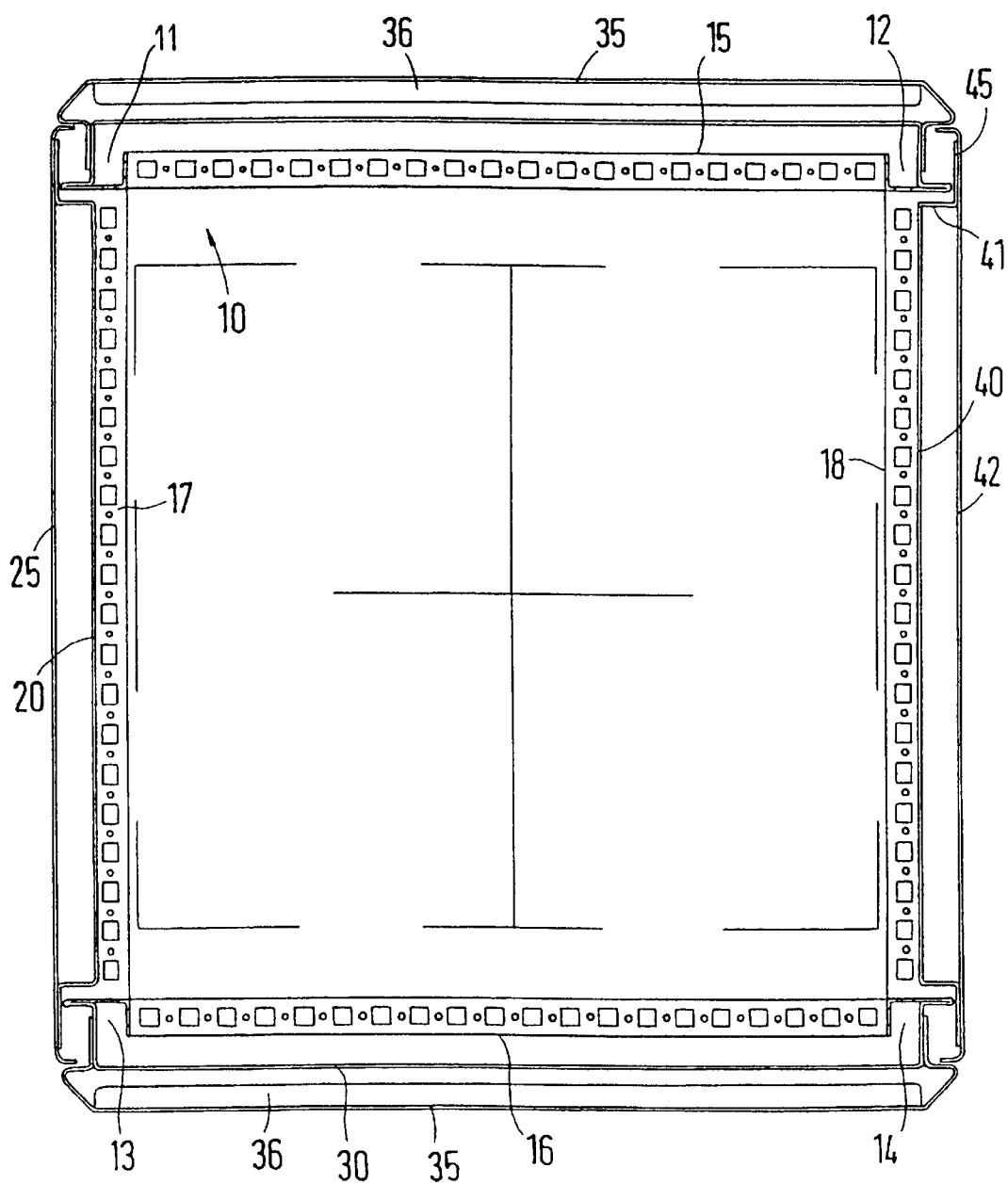
FIG. 1 is a horizontal cross sectional view of a "double-walled" switchgear cabinet in accordance with one embodiment of this invention.

FIG. 1 shows a horizontal cross-sectional view of a switchgear cabinet having all vertical sides embodied as double-walled. In accordance with this embodiment, the rear wall 20, the two side walls 30 and the inner door wall 40 form an "inner cabinet", and the protective wall 25 associated with the rear wall 20 together with the protective walls 35 of the side walls 30 and the outer door wall 42 form an "outer cabinet", which are designed independently of each other in the design of their surface and which can be optimally matched to the use of the switchgear cabinet.

As shown in FIG. 1, the vertical frame legs 11, 12, 13 and 14 of the rack 10 are beveled at the side walls 30, which will be shown in detail later. The horizontal frame legs 15, 16, 17 and 18, for example in the area of the underside of the switchgear cabinet, can be individual separate frame legs and complement the rack 10. The rack 10 can also be assembled from individual frame legs.

Figure 2:
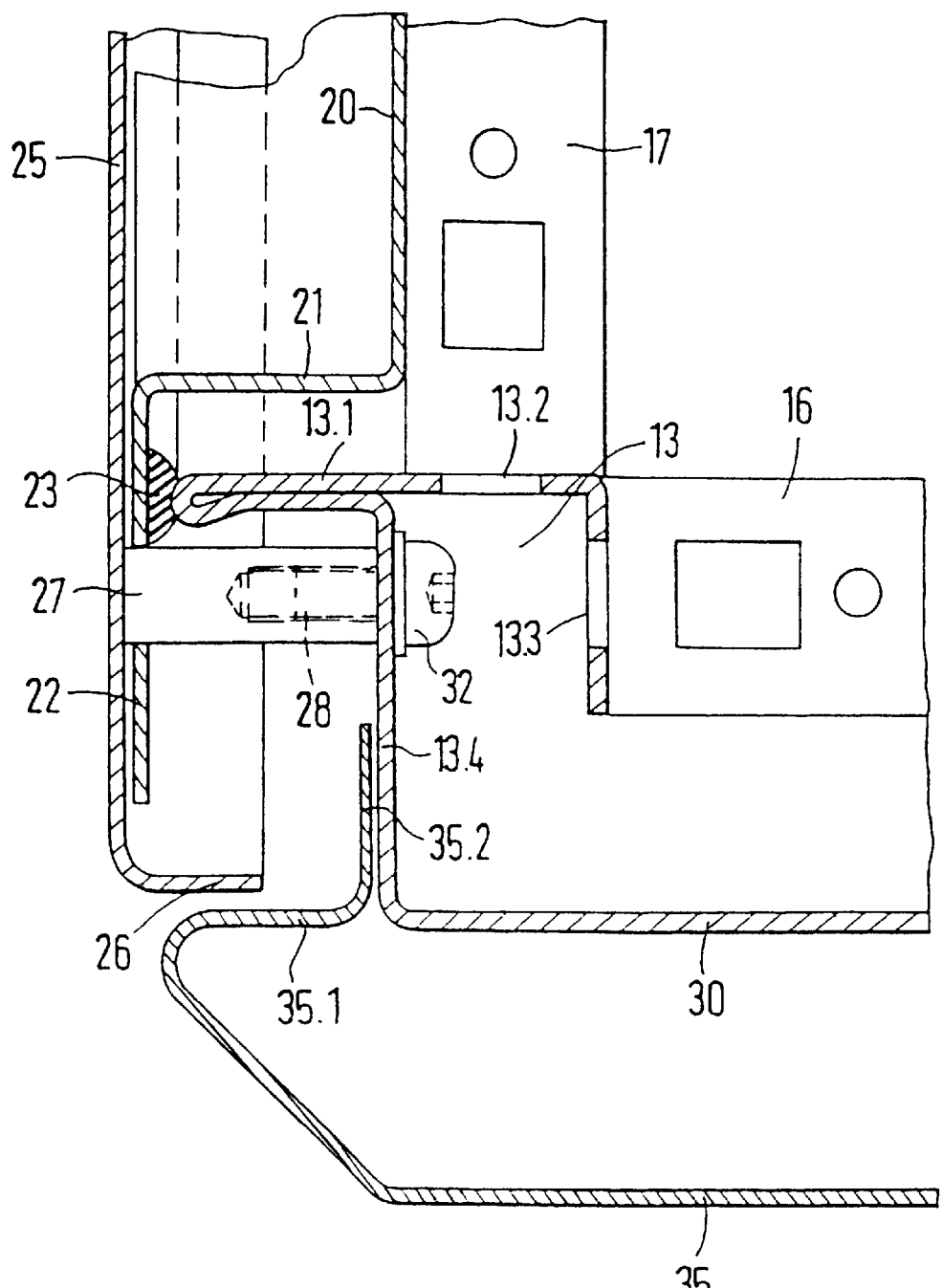
FIG. 2 is an enlarged partial cross-sectional view in the area of the vertical joint between the rear and one side of the switchgear cabinet, wherein the vertical frame legs are beveled at the side wall.

The design of the vertical joint between the rear wall 20 and a side wall 30 with beveled frame legs 13 will be shown in detail and explained using the partial sectional view of FIG. 2.

The beveled sections 13.4 and 13.1, together with the end section provided with the openings 13.3, form a frame leg 13 embodied as an open hollow profile section. The rear wall 20 rests against the rack, as shown for frame leg 13. The rear wall 20 is beveled in an L-shape at the vertical sides, as represented by 21 and 22. The end section 22 of the bevel 21 rests by way of seal 23 against the double-layered sealing strip 13.1 of the frame leg 13. Bores for fastening screws 32 are formed in the profile side 13.4 of the frame leg 13. The protective wall 25 for the rear wall 20 is provided with a circumferential, inwardly beveled edge 26, and on its inside has connecting bolts 27 with threaded receptacles 28. The protective wall 25 is screwed by these connecting bolts 27 and the fastening screws 32 to the profile side 13.4 of the frame leg 13. If the rear wall 20 has bores for the connecting bolts 27 in its end section 22, the rear wall 20 with the protective wall 25 can be fastened on the rack 10. So that the fastening screws 32 can be inserted into the bores in the profile side 13.4, openings 13.3 are formed by the end section of the frame leg 13, which are aligned with the bores in the profile side 13.4. In accordance with this embodiment, the layout of the rear wall 20 with the bevels 21 and 22 as well as the connecting bolts 27 is such that the rear wall 20 held on the connecting bolts 27 is pressed by means of the seal 23 against the sealing strip 13.1 of the frame leg 13 and sealed.

The beveled edge 26 of the protective wall 25 partially extends over the sealing strip 13.1 and the connecting bolts 27, so that only a small free space is created between the beveled edge 26 of the protective wall 25 and the rack 10, i.e. the profile side 13.4 of the frame leg 13, into which the beveled end sections 35.2 of the protective wall 35 of the side wall 30 can be inserted and also connected to the frame leg 13. In this way, the transition section 35.1 covers the free space between the beveled edge 26 of the protective wall 25 and the rack 10 with its profile side 13.4. The fastening places with the fastening screws 32 are covered in this way and are not accessible through the joint. The connection of the other vertical side of the rear wall 20 and the protective wall 25 with the frame leg 11 is identically designed, and the attachment and design of the adjoining side wall 30 and the protective wall 35 are the same as shown in FIG. 2.

In accordance with one embodiment of this invention, end section 35.2 of the protective wall 35 extends farther toward the interior, so that it can also be fastened by fastening screw 32 on the profile side 13.4 of the frame leg 13.

Figure 3:
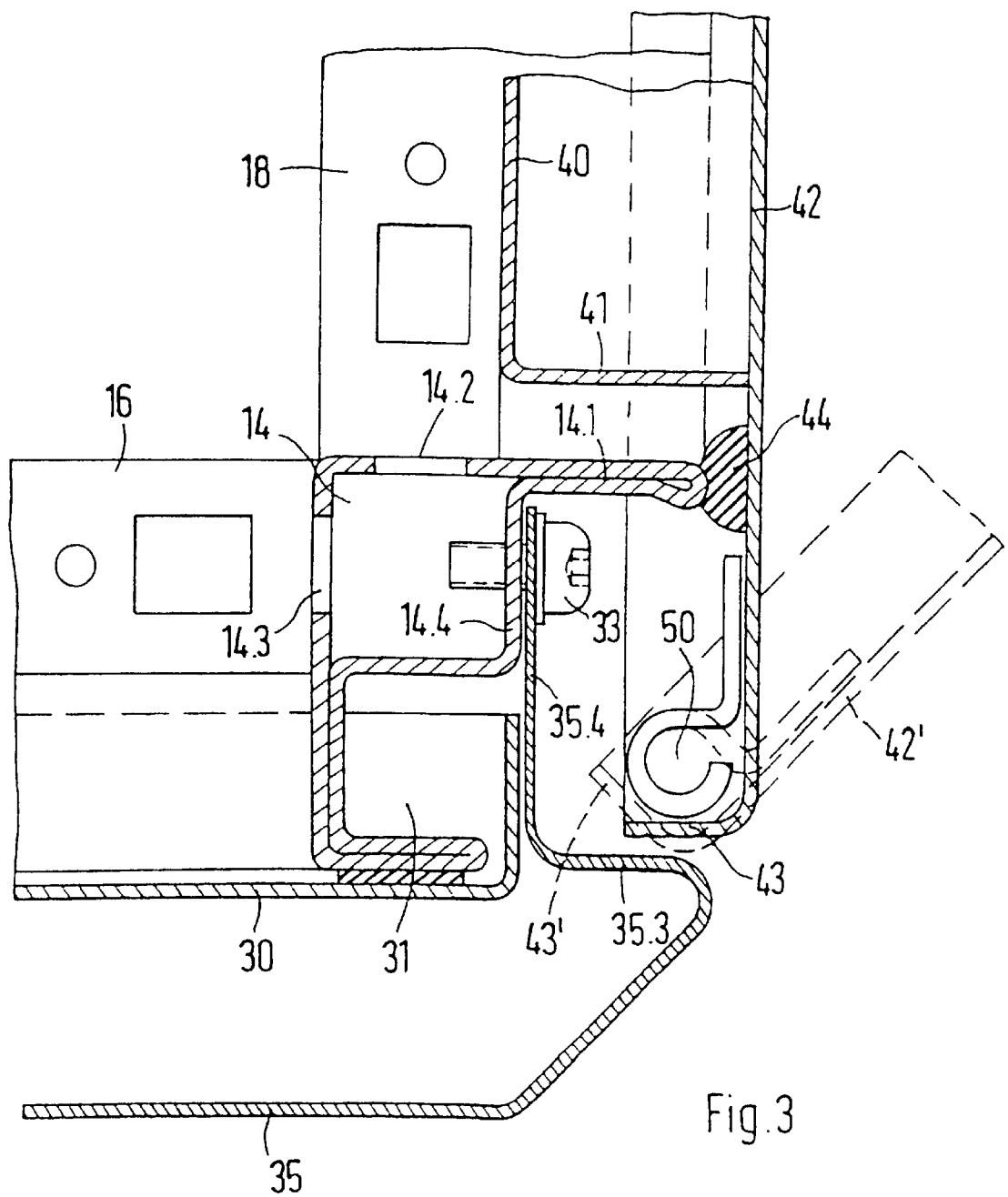
FIG. 3 is an enlarged partial cross-sectional view of the vertical joint between the hinge side of the cabinet door and a side wall, wherein the vertical frame legs are separated from the side wall.

The vertical joint between a side wall 30 with a protective wall 35 and the double-walled cabinet door is shown in FIG. 3. As shown, the rack 10 is formed by separate frame legs, as shown by the vertical frame leg 14. In this case, the side wall 30 comprises a circumferential edge 31, and rests by means of seals against the contact strips of the frame legs 13 and 14 of the rack 10. The end section 35.4 of the protective wall 35 is fastened by fastening screw 33 on the profile side 14.4 of the frame leg 14. The openings 14.3 and 14.2 are provided for fastening built-ins. The section 35.3 of the protective wall 35 covers the space in which the cabinet door is received. The cabinet door has an inner door wall 40 and an outer door wall 42. Both are spaced apart and parallel to each other and, like the rear wall 20 and its protective wall 35, form a unit. With the beveled edge 41, the inner door wall 40 is directly supported on the inside of the outer door wall 42 and is connected to it.

As already shown in FIG. 1, the beveled edge 41 of the inner door wall 40 in accordance with one embodiment is L-shaped, wherein an end section 45 rests on the inside of the outer door wall 42 and is connected to it. The end section 45 then extends up to the beveled edge 43 of the outer door wall 42. Adjoining the beveled edge 43, a hinge element 50 is fastened on the inside, hingedly connected by a hinge bolt, not shown, with a second hinge element fastened to the frame leg 14. In the receptacle space divided by the edge 41, a seal 44 is applied to the inside of the cabinet door which, together with the sealing strip 14.1, sealingly closes the cabinet door in the closed position.

The hinged cabinet door extends up to the section 35.3 of the protective wall 35, so that not only the fastening places with the fastening screws 33, but also the hinges are covered and not accessible. The same applies to the locking elements on the other vertical side of the cabinet door, which is designed in the same way and forms an identical joint with the adjoining side wall 30 having protective wall 35.

As FIG. 3 furthermore shows, the protective wall 35 does not hamper the opening of the cabinet door, as shown by the position of the cabinet door indicated by 42' and 43'.

Figure 4:
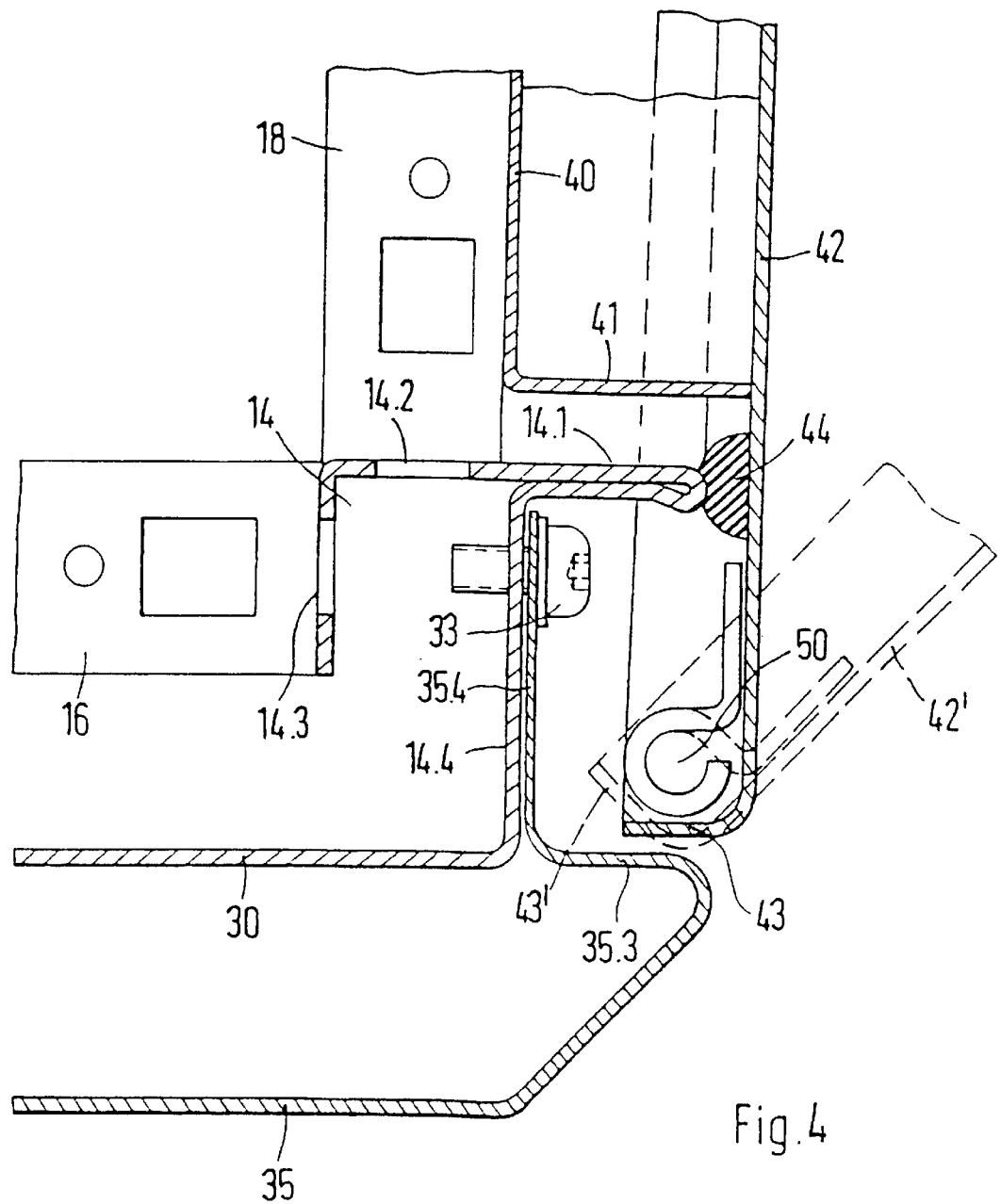
FIG. 4 is an enlarged partial cross-sectional view of the vertical joint between the hinge of the cabinet door and a side wall, wherein the vertical frame legs are beveled at the side wall.

When designing the joint between a side wall 30 with the protective wall 35 and the double-walled cabinet door in accordance with FIG. 4, the vertical frame leg 14 is again beveled on the side wall 30. The same applies to the frame leg 12 on the closing side of the cabinet door. Otherwise, the door walls 40 and 42 can be embodied the same as in FIG. 3.

FIG. 2 shows the horizontal frame legs 16 and 17 meeting the vertical frame leg 13, while FIGS. 3 and 4 show the horizontal frame legs 16 and 18 meeting the vertical frame leg 14.

The two side walls 30 in accordance with one embodiment are connected in one piece by a ceiling. In this case, the ceiling supports a portion of the horizontal frame legs.

Protection of the underside of the switchgear cabinet is provided by a base, preferably connected from the interior of the switchgear cabinet to the underside.

For improving security, in accordance with one embodiment an additional housing is disposed on the top of the switchgear cabinet, for example that of an air conditioning unit, which is also double-walled.

We claim:

1. In a switchgear cabinet having a rack one of assembled from a plurality of individual frame legs and formed by a plurality of individual frame legs bent off at two side walls, said rack having open, vertical sides closed off by said side walls and a rear wall, said side walls and said rear wall being fastened on facing frame legs of the rack, and a cabinet door being hinged on vertical frame legs of a front of the rack and being arrested in a closed position;

the improvement comprising:

each of the rear wall (20) and the two side walls (30) covered by a protective wall (25, 35) spaced apart from said rear wall (20) and said side walls (30) and connected to facing vertical frame legs (11, 12, 13, 14) of the rack (10);

the cabinet door comprising double walls, an inner door wall (40) of said double walls being disposed at a distance from an outer door wall (42) of said double walls and forming at least one receptacle space for at least one seal (44), at least one hinge (50) and at least one locking element free in a direction of a vertical edge of the outer door wall (42);

the protective walls (35) ofthe side walls (30) having beveled protective wall vertical edges whereby said protective wall vertical edges cover a free space between the protective wall (25) of the rear wall (20) and the rack (10) and the at least one receptacle space between the outer door wall (42) and the rack (10);

the rear wall (20) comprising at least one L-shaped beveled edge (21) having an end section (22) resting by way of at least one seal (23) against a sealing strip on the facing vertical frame leg (11, 13); and the at least one L-shaped beveled edge (21) forming a bore for each of the connecting bolts (27) of an associated said protective wall (25) and are held together with said associated protective wall (25) on the rack.

2. A switchgear cabinet in accordance with claim 1, wherein the protective wall (25) for the rear wall (20) comprises, in an area of the beveled protective wall vertical sides, connecting bolts (27) attached on its inside, said connecting bolts (27) being screwed together with a profile side (13.4) of the facing vertical frame legs (11, 13) of the rack (10).

3. A switchgear cabinet in accordance with claim 2, wherein the protective wall (25) of the rear wall (20) comprises a circumferential edge (26) bent inward at right angles, said circumferential edge (26) at least partially covering the L-shaped beveled edge (21) of the rear wall (20) and a sealing strip (13.1) of the facing vertical frame leg(11, 13).

4. A switchgear cabinet in accordance with claim 2, wherein the connecting bolts (27) are provided with threaded receptacles (28) and are supported by their ends on a profile side (13.4) of the facing vertical frame leg (11, 13) of the rack (10), which is aligned parallel with the rear wall (20), and a fastening screw (32) is inserted through a profile bore in said profile side (13.4) and is screwed into the threaded receptacle (28) of a corresponding said connecting bolt (27).

5. A switchgear cabinet in accordance with claim, 4, wherein a frame leg profile side of the frame leg (11, 13) is aligned parallel to said profile side (13.4), spaced apart therefrom and forms at least one aligned opening (13.3).

6. A switchgear cabinet in accordance with claim 2, wherein the protective wall (25) of the rear wall (20) comprises a circumferential edge (26) bent inward at right angles, said circumferential edge (26) at least partially covering the L-shaped beveled edge (21) of the rear wall (20) and the sealing strip (13.1) of the facing vertical frame leg (11, 13).

7. A switchgear cabinet in accordance with claim 6, wherein the connecting bolts (27) are provided with threaded receptacles (28) and are supported by their ends on a profile side (13.4) of the facing vertical frame leg (11, 13) of the rack (10), which is aligned parallel with the rear wall (20), and a fastening screw (32) is inserted through a profile bore in said profile side (13.4) and is screwed into the threaded receptacle (28) of a corresponding said connecting bolt (27).

8. A switchgear cabinet in accordance with claim 7, wherein a frame leg profile side of the frame leg (11, 13) is aligned parallel to said profile side (13.4), spaced apart therefrom and forms at least one aligned opening (13.3).

9. A switchgear cabinet in accordance with claim 8, wherein the bevels (35.3, 35.4) of said beveled protective wall vertical edges of the protective walls (35) for the side walls (30) are connected to a profile side (13.4, 14.4) of a corresponding said facing vertical frame leg (11, 12, 13, 14).

10. A switchgear cabinet in accordance with claim 9, wherein each profile side (13.4, 14.4) is oriented vertically in respect to the side walls (30) and the associated protective walls (35).

11. A switchgear cabinet in accordance with claim 10, wherein each end section (35.4) of the protective walls (35) for the side walls (30) is inserted into the free spaces between the protective wall (25) for the rear wall (20) and the rack (10), and into the receptacle spaces between the outer door wall (42) and the rack (10).

12. A switchgear cabinet in accordance with claim 11, wherein the inner door wall (40) is supported by a beveled inner door wall edge (41) on an inside of the outer door wall (42) and is connected to said outer door wall (42).

13. A switchgear cabinet in accordance with claim 11, wherein the inner door wall (40) comprises a twice beveled inner door wall edge (41, 45) an end section (45) of which is connected to an inside of the outer door wall (42), and the end section (45) extends to an outer door wall edge (43) of the outer door wall (42).

14. A switchgear cabinet in accordance with claim 13, wherein the rear wall (20) and an associated said protective wall (25) form a unit which is constructed identical to the double-walled cabinet door comprising the inner door wall (40) and the outer door wall (42).

15. A switchgear cabinet in accordance with claim 14, wherein the protective walls (25, 35) and the outer door wall (42) comprise an additional protective surface layer, and the rack (10), the rear wall (20), the side walls (30) and the inner door wall (40) comprise electrically conducting surfaces.

16. A switchgear cabinet in accordance with claim 15, wherein an underside of the rack (10) is connected to a base.

17. A switchgear cabinet in accordance with claim 16, wherein an additional double-walled housing is fastened to a top of said switchgear cabinet.

18. A switchgear cabinet in accordance with claim 1, wherein a bevel (35.3, 35.4) of said beveled protective wall vertical edges of the protective walls (35) for the side walls (30) is connected to a profile side (13.4, 14.4) of a corresponding said facing vertical frame leg (11, 12, 13, 14).

19. A switchgear cabinet in accordance with claim 18, wherein each profile side (13.4, 14.4) is oriented vertically in respect to the side walls (30) and the associated protective walls (35).

20. A switchgear cabinet in accordance with claim 18, wherein each end section (35.4) of the protective walls (35) for the side walls (30) is inserted into the free spaces between the protective wall (25) for the rear wall (20) and the rack (10), and into the receptacle spaces between the outer door wall (42) and the rack (10).

21. A switchgear cabinet in accordance with claim 1, wherein the inner door wall (40) is supported by a beveled inner door wall edge (41) on an inside of the outer door wall (42) and is connected to said outer door wall (42).

22. A switchgear cabinet in accordance with claim 1, wherein the inner door wall (40) comprises a twice beveled inner door wall edge (41.45) an end section (45) of which is connected to an inside of the outer door wall (42), and the end section (45) extends to an outer door wall edge (43) of the outer door wall (42).

23. A switchgear cabinet in accordance with claim 1, wherein the rear wall (20) and an associated said protective wall (25) form a unit which is constructed identical to the double-walled cabinet door comprising the inner door wall (40) and the outer door wall (42).

24. A switchgear cabinet in accordance with claim 1, wherein the protective walls (25, 35) and the outer door wall (42) comprise an additional protective surface layer, and the rack (10), the rear wall (20), the side walls (30) and the inner door wall (40) comprise electrically conducting surfaces.

25. A switchgear cabinet in accordance with claim 1, wherein an underside of the rack (10) is connected to a base.

26. A switchgear cabinet in accordance with claim 1, wherein an additional double-walled housing is fastened to a top of said switchgear cabinet.

* * * * *